United States Patent
Friberg

(10) Patent No.: US 10,668,603 B2
(45) Date of Patent: Jun. 2, 2020

(54) IMPULSE WRENCH ROTATION DETECTION

(71) Applicant: ATLAS COPCO INDUSTRIAL TECHNIQUE AB, Stockholm (SE)

(72) Inventor: John Robert Christian Friberg, Nacka (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 74 days.

(21) Appl. No.: 15/774,718

(22) PCT Filed: Dec. 9, 2016

(86) PCT No.: PCT/EP2016/080450
§ 371 (c)(1),
(2) Date: May 9, 2018

(87) PCT Pub. No.: WO2017/102585
PCT Pub. Date: Jun. 22, 2017

(65) Prior Publication Data
US 2018/0354107 A1    Dec. 13, 2018

(30) Foreign Application Priority Data
Dec. 14, 2015  (SE) ...................................... 1551633

(51) Int. Cl.
*B25B 23/14* (2006.01)
*G01D 5/14* (2006.01)
*B25B 21/02* (2006.01)

(52) U.S. Cl.
CPC ........... *B25B 23/1405* (2013.01); *G01D 5/14* (2013.01); *B25B 21/02* (2013.01)

(58) Field of Classification Search
CPC ................................................. B25B 23/1405
See application file for complete search history.

(56) References Cited

U.S. PATENT DOCUMENTS

| | | | |
|---|---|---|---|
| 5,492,185 A * | 2/1996 | Schoeps .............. | B25B 23/1453 173/177 |
| 2008/0135269 A1* | 6/2008 | Friberg .............. | B25B 23/1405 173/93.5 |

(Continued)

FOREIGN PATENT DOCUMENTS

WO    2015139952 A1    9/2015

OTHER PUBLICATIONS

International Search Report (ISR) and Written Opinion dated Mar. 28, 2017 issued in International Application No. PCT/EP2016/080450.

*Primary Examiner* — Jas A Sanghera
(74) *Attorney, Agent, or Firm* — Holtz, Holtz & Volek PC

(57) ABSTRACT

A method for detecting deviations between an actual angular displacement in a screw joint being tightened by an impulse type power wrench and an angular displacement measured between a power wrench housing and an impulse unit of the power wrench, includes determining a first angular interval ($\Delta\phi_1$) between an end point ($A_E$) of a first delivered impulse (A) and an end point ($B_E$) of a succeeding second delivered impulse (B), determining a second angular interval ($\Delta\phi_2$) between a start point ($B_S$) of the second delivered impulse (B) and a start point ($C_S$) of a succeeding third delivered impulse (C), comparing ($\Delta\phi_1$) with ($\Delta\phi_2$) to determine a difference between the intervals, and determining that a deviation exists between the actual angular displacement in the screw joint and the angular displacement measured between the power wrench housing and the impulse unit based on the determined difference between the intervals ($\Delta\phi_1$ and $\Delta\phi_2$).

12 Claims, 2 Drawing Sheets

(56) References Cited

U.S. PATENT DOCUMENTS

2009/0139738 A1 6/2009 Lippek
2009/0255700 A1 10/2009 Lehnert et al.
2017/0043460 A1 2/2017 Gustafsson

* cited by examiner

IMPULSE WRENCH ROTATION DETECTION

TECHNICAL FIELD

The invention relates a method and a device for detecting occurring deviations between the rotational movement actually obtained in a screw joint being tightened by an impulse type power wrench and the angular displacements of and the angular displacement measured between the power wrench housing and the impulse unit of the power wrench.

BACKGROUND

Because of the dynamic characteristics of the delivered short lasting torque impulses there is a problem to measure the actually delivered output torque magnitude in this type of power wrenches. Due to varying frictional resistance in screw joints the torque level is not a definite measurement of the actually obtained clamping force anyway. So, instead of trying to determine the torque imposed on the screw joint the more reliable clamping force is determined by measuring and establishing the sum of the rotational increments imposed on screw joint by repeated torque impulses. In consideration of the pre-established angle-to-clamping-force relationship of the actual screw joint, i.e. the pitch of the screw joint thread, the sum of the rotational increments corresponds to a certain clamping force obtained in screw joint. Accordingly, the total rotational movement of the output shaft is obtained by summarizing the rotational increments can be indicated by an angle encoder provided at the impulse unit of the power wrench.

In practice this has been done by measuring the rotational increments of the inertia drive member of the impulse unit in relation to the power wrench housing and forming a sum of these increments. However, this gives a correct information of the amount of rotation imposed on the screw joint being tightened only if the power wrench housing remains absolutely immobile during the tightening operation. If however some rotational displacement of the power wrench housing occurs the angle measurement in the power wrench impulse unit would be misleading and not correspond to the actually obtained rotational movement of the screw joint. This means that the sum of the rotational increments measured in the impulse unit gives misleading information of the tightening level actually obtained in the screw joint.

So, there is a problem to verify the true amount of rotation imposed on the screw joint, because manually supported tools of this type are dependent on the operator's ability to keep the wrench housing immobile during torque delivery. In some cases the impulse wrench may tend to rotate somewhat in the opposite direction due to reaction forces transferred to the wrench housing during torque delivery. In other cases the operator, consciously or not, may rotate the wrench housing in the tightening direction which also makes the rotational increments indicated by the angle encoder of the wrench misleading as to the actual rotational movement imposed on the screw joint being tightened.

This means that in cases where the operator does not succeed to keep the power wrench housing immobile, i.e. to prevent rotational displacements of the housing during tightening, the data obtained from the angle encoder of the impulse mechanism will not give a true information on the obtained screw joint rotation and, hence, the tightening level of a screw joint.

SUMMARY

It is an object of the invention to provide a method for establishing whether the rotational movement actually imposed on a screw joint during tightening by a manually supported impulse type power wrench corresponds to the sum of rotational increments of the output shaft of the wrench indicated by an angle encoder provided at the impulse unit of the wrench.

It is a further object of the invention to provide a method to establish whether the rotational movement actually imposed on a screw joint during tightening by a manually supported impulse type power wrench corresponds to the sum of rotational increments of the output shaft of the wrench indicated at the impulse unit by comparing angular displacements of the impulse unit relative to the wrench housing at delivery of succeeding impulses.

These object or some other objects are obtained by the method and device as set out in the appended claims.

The invention aims to detect deviations between the rotational movement actually imposed on a screw joint being tightened and the angular displacements measured on the impulse generating unit of the power wrench to thereby detect occurring rotational displacements of the power wrench housing during a screw joint tightening operation. In particular, the invention enables studying and analyzing the individual movements of the torque impulse generating unit of an impulse wrench during operation to thereby verify the tightening result accomplished by the delivered torque impulses. The individual movements can be studied and analyzed to determine deviations without the use of a gyro.

In accordance with one embodiment a method for detecting deviations between the angular displacement actually obtained in a screw joint being tightened by an impulse type power wrench and the angular displacement measured between the power wrench housing and the impulse unit of the power wrench is provided. The method comprises to determine a first angular interval between an end point of a first delivered impulse and an end point of a succeeding second delivered impulse, and to determining a second angular interval between a start point of said second delivered impulse and a start point of a succeeding third delivered impulse. The first angular interval is compared to the second angular interval to determine the difference between the first and the second angular intervals. A deviation is then determined to exist between the angular displacement actually obtained in a screw joint being tightened by an impulse type power wrench and the angular displacement measured between the power wrench housing and the impulse unit of the power wrench based on the determined difference between said first and said second angular intervals ΔΦ1 and ΔΦ2. Hence a deviation of the measured angular rotation and the actual angular rotation of a screw, nut or bolt caused by a rotational movement of the power wrench during tightening of a joint can be detected by detecting a difference between the first and second angular intervals. These measurements can be recorded without the use of any additional sensors such as a gyro, and the detection can therefore be implemented without any significant additional costs.

In accordance with one embodiment the end and start points of the succeeding delivered torque impulses are chosen as certain rotation speed change levels of the impulse unit of the power wrench.

In accordance with one embodiment the determination that a deviation exists is based on a comparison between the determined difference between said first and said second angular intervals and a pre-set threshold value.

In accordance with one embodiment output of an alert signal is generated when a deviation is determined to exist between the first and the second angular intervals, respectively.

The invention also extends to a computer program product comprising instructions for implementing the method and to different devices that can utilize the method such as a power wrench or a control unit connected to and controlling a power wrench. Still further objects and advantages of the invention will appear from the following specification and claims.

BRIEF DESCRIPTION OF DRAWINGS

The invention will now be described in further detail in the following specification and claims with reference to the accompanying drawings, in which.

DETAILED DESCRIPTION

The method according to the invention is intended to be applied on an impulse type power wrench having a manually supported housing 10 with a rotation motor and an impulse generating unit 12. The latter comprises an inertia drive member 13 coupled to a motor and arranged to transfer kinetic energy intermittently to an anvil member connected to the output shaft 14 of the, typically hand held, power wrench. The energy transfer is accomplished via a hydraulic medium confined in the impulse generating unit. Since the impulse generating unit is of a common well known type and design a further detailed description thereof is left out of this specification.

Figure 1:
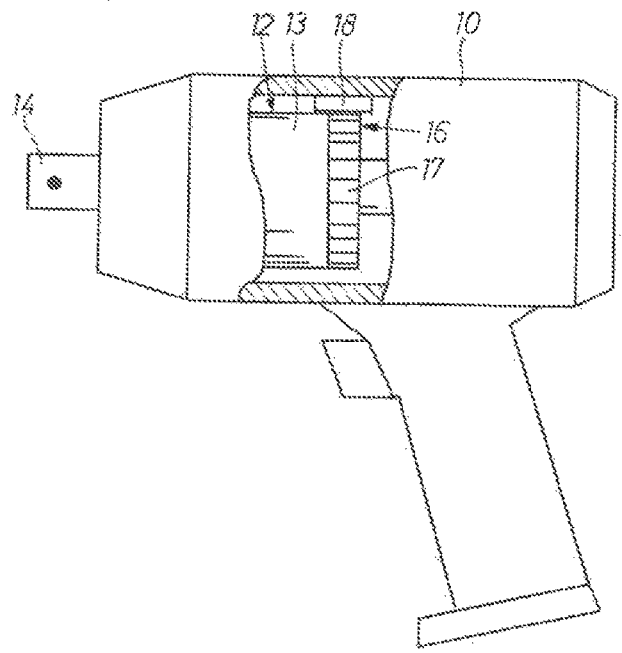
FIG. 1 shows schematically a side view, partly in section, of an impulse type power wrench illustrating the impulse generating unit with an angle encoder.

The impulse generating unit also comprises an angle sensor such as an angle encoder 16 for indicating and measuring the rotational movements of the inertia drive member 13 of the impulse unit 12 in relation to the housing 10 during each generated torque impulse to thereby enable measurement of the rotational displacements of the output shaft 14 and, hence, the stepwise angular displacements of a screw joint being tightened. The sum of these angular displacements corresponds to the clamping force obtained in the screw joint. This is easily calculated in view of the thread pitch of the screw joint. The angle encoder 16 in accordance with the embodiment shown in FIG. 1 is of a prior art type and comprises a circumferential band 17 mounted on the inertia drive member 13 and having a large number of magnetized transverse stripes. Other angle sensors can be used in other embodiments. A sensor 18 is secured in the housing 10 and being activated by the magnetized stripes of the band 17 at rotation of the inertial drive member 13.

Figure 2:
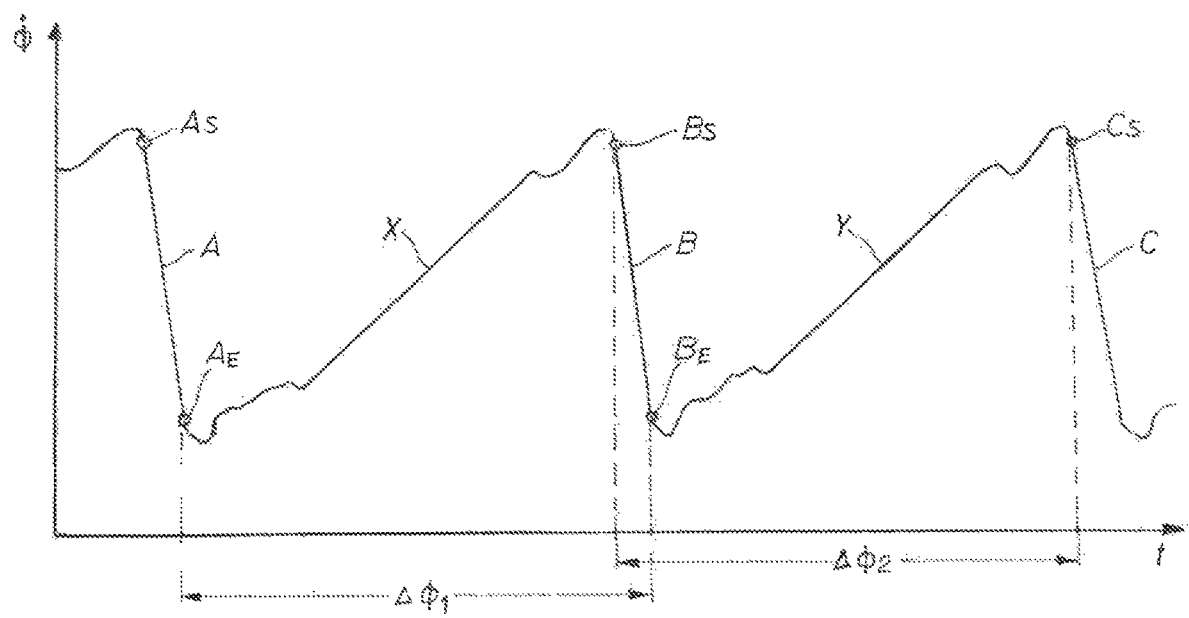
FIG. 2 shows a diagram illustrating the angular speed over time of the inertia drive member of the power wrench impulse generating unit in relation to the power wrench housing.

The rotation speed/time diagram of FIG. 2 illustrates parts of three succeeding torque impulses wherein start points as well as end points of these impulses are indicated. To the left in the diagram an end point $A_E$ of a first impulse A is chosen as a certain degree of rotation speed increase of the inertia drive member in relation to the housing. The following impulse B is preceded by an acceleration phase X of the inertia drive member, and the start point $B_S$ of the impulse B is chosen as a decrease of the inertia drive member rotation speed. The impulse B is completed at an end point $B_E$ and is succeeded by a third impulse C which is preceded by an acceleration phase Y. The Impulse C begins at a start point $C_S$.

Each one of the points $A_S$, $A_E$, $B_S$, $B_E$ and $C_S$, $C_E$ represents an angular position of the inertia drive member 13 relation to the housing 10, which means that it is possible to determine an angular interval $\Delta\Phi_1$ between the end point $A_E$ of impulse A and the end point $B_E$ of impulse B as well as an angular interval $\Delta\Phi_2$ between the start point $B_S$ of impulse B and the start point $C_S$ of impulse C.

If the power wrench housing during impulse delivery has been kept completely immobile during generation of the torque impulses A, B and C the angular intervals $\Delta\Phi_1$ and $\Delta\Phi_2$ should be identical. Accordingly, if an angular displacement of the power wrench housing has occurred during the impulse delivery a difference between the angular intervals $\Delta\Phi_1$ and $\Delta\Phi_2$ can be observed. Such a difference in angular displacement indicates that a movement of the power wench housing has occurred and that the measured and calculated sum of the angular displacements of the inertia drive member does not truly correspond to the angular displacement actually imposed on the screw joint being tightened. This means that the accomplished clamping force or tightening level of the screw joint does not truly correspond to the indicated and calculated sum of angular displacements of the inertia drive member of the impulse unit and that the tightening level actually obtained should be checked for ascertaining the quality and safety of the screw joint. In accordance with some embodiments an indicator such as a light or sound generating device is provided on the power wrench or in the vicinity of the operator operating the power wrench to indicate that screw joint should be checked.

Figure 3:
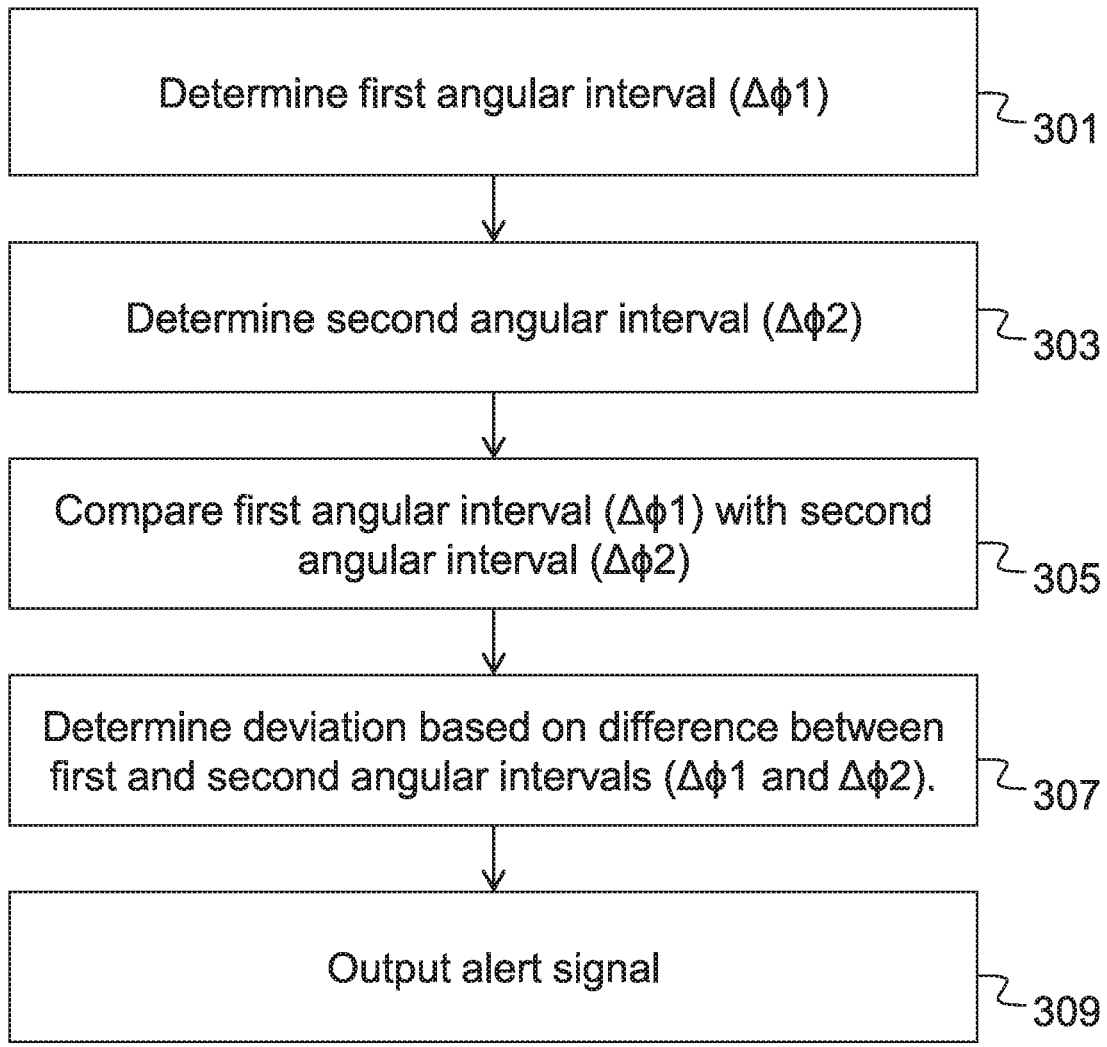
FIG. 3 is a flow chart illustrating some procedural steps performed when detecting an angular deviation.

In FIG. 3 a flow chart illustration some procedural steps that can be performed by a computer program when performing the method as set out herein. First in a step 301 a first angular interval $\Delta\Phi 1$ between an end point AE of a first delivered impulse A and an end point BE of a succeeding second delivered impulse B is determined.

Next, in a step 303 a second angular interval $\Delta\Phi 2$ between a start point BS of said second delivered impulse B and a start point CS of a succeeding third delivered impulse C is determined. Thereupon, in a step 305 the first angular interval $\Delta\Phi 1$ is compared with the second angular interval $\Delta\Phi 2$) to determine the difference between said first and said second angular intervals ($\Delta\Phi_1$ and $\Delta\Phi_2$). An occurring difference between said first and said second angular intervals ($\Delta\Phi 1$ and $\Delta\Phi 2$) indicates a deviation between the angular displacement measured between the power wrench housing (10) and the impulse unit (12) and the angular displacement actually imposed on the screw joint being tightened. If a difference is determined to exist between the first and the second angular intervals $\Delta\Phi 1$ and $\Delta\Phi 2$, respectively in a step 305, a deviation between the angular displacement measured between the power wrench housing 10 and the impulse unit 12 and the angular displacement actually imposed on the screw joint being tightened is determined to exist in a step 307. A signal alerting the operator or a control system can then be output to make the operator of the power wrench aware of a potentially inferior screw joint in a step 309.

In accordance with one exemplary embodiment a difference is determined to exist in step 307 if the difference exceeds a pre-set threshold value. The pre-set threshold value can be set differently for different screw joint to compensate for different tolerances acceptable for different screw joints.

In accordance with some embodiments, data relating to a determined potentially inferior screw joint can also be logged for follow-up purposes and to form a basis for statistics regarding a particular power wrench or a particular operator to determine if a problem exists with a particular power wrench or a particular operator. This can for example be determined by comparing a frequency at which a potentially inferior screw joint is determine with some predetermined value(s). The data that is logged can for example comprise one or more of: time, identity of power wrench, identity of operator, and magnitude of the determined difference.

By the methods and devices according to the invention it is possible to detect uncertainties of the delivered tightening movements imposed on a screw joint being tightened and, hence the finally obtained tightening level of the screw joint, without adding any extra equipment in the form of for instance gyros to the power wrench. Occurring angular displacements of the power wrench housing during impulse delivery may be detected by an angle sensor such an angle encoder in the impulse unit which is standard equipment in most impulse wrenches today.

The method can be implemented using suitable software executed on a computer. The software can be stored on a non-volatile device. In accordance with some embodiment the power wrench it-self houses the hardware such as a central processor unit and an associated memory that comprises the software enabling the execution of the method as described herein. In accordance with some other embodiments the method is executed in a power tool controller located remote from the power wrench.

The invention claimed is:

1. A method for detecting deviations between an actual angular displacement in a screw joint being tightened by an impulse type power wrench and an angular displacement measured between a power wrench housing and an impulse unit of the power wrench, the method comprising:
    determining a first angular interval ($\Delta\phi_1$) between an end point ($A_E$) of a first delivered impulse (A) and an end point ($B_E$) of a succeeding second delivered impulse (B);
    determining a second angular interval ($\Delta\phi_2$) between a start point ($B_S$) of the second delivered impulse (B) and a start point ($C_S$) of a succeeding third delivered impulse (C);
    comparing the first angular interval ($\Delta\phi_1$) with the second angular interval ($\Delta\phi_2$) to determine a difference between the first and the second angular intervals ($\Delta\phi_1$ and $\Delta\phi_2$); and
    determining whether a deviation exists between the actual angular displacement in the screw joint being tightened by the impulse type power wrench and the angular displacement measured between the power wrench housing and the impulse unit of the power wrench based on the determined difference between the first and said second angular intervals ($\Delta\phi_1$ and $\Delta\phi_2$).

2. The method according to claim 1, wherein the end and start points ($A_E$, $B_E$ and $B_S$, $C_S$) of the first, second, and third delivered torque impulses (A, B, C) are chosen as certain rotation speed change levels of the impulse unit of the power wrench.

3. The method according to claim 2, wherein the determination whether a deviation exists is based on a comparison between the determined difference between the first and second angular intervals ($\Delta\phi_1$ and $\Delta\phi_2$) and a pre-set threshold value.

4. The method according to claim 3, further comprising outputting an alert signal when a deviation is determined to exist.

5. The method according to claim 2, further comprising outputting an alert signal when a deviation is determined to exist.

6. The method according to claim 1, wherein the determination whether a deviation exists is based on a comparison between the determined difference between the first and second angular intervals ($\Delta\phi_1$ and $\Delta\phi_2$) and a pre-set threshold value.

7. The method according to claim 6, further comprising outputting an alert signal when a deviation is determined to exist.

8. The method according to claim 1, further comprising outputting an alert signal when a deviation is determined to exist.

9. A non-transitory computer readable medium storing a program executable by a computer to detect deviations between an actual angular displacement in a screw joint being tightened by an impulse type power wrench and an angular displacement measured between a power wrench housing and an impulse unit of the power wrench, the program being executable by the computer to cause the computer to perform operations comprising:
    determining a first angular interval ($\Delta\phi_1$) between an end point ($A_E$) of a first delivered impulse (A) and an end point ($B_E$) of a succeeding second delivered impulse (B);
    determining a second angular interval ($\Delta\phi2$) between a start point ($B_S$) of the second delivered impulse (B) and a start point ($C_S$) of a succeeding third delivered impulse (C);
    comparing the first angular interval ($\Delta\phi_1$) with the second angular interval ($\Delta\phi_2$) to determine a difference between the first and the second angular intervals ($\Delta\phi_1$ and $\Delta\phi_2$); and
    determine whether a deviation exists between the first and the second angular intervals, $\Delta\phi_1$ and $\Delta\phi_2$, based on the determined difference between the first and second angular intervals ($\Delta\phi_1$ and $\Delta\phi_2$).

10. A device for detecting deviations between an actual angular displacement in a screw joint being tightened by an impulse type power wrench and an angular displacement measured between a power wrench housing and an impulse unit of the power wrench, the device comprising:
    a determination circuit adapted to determine a first angular interval ($\Delta\phi_1$) between an end point ($A_E$) of a first delivered impulse (A) and an end point ($B_E$) of a succeeding second delivered impulse (B), and adapted to determine a second angular interval ($\Delta\phi_2$) between a start point ($B_S$) of the second delivered impulse (B) and a start point ($C_S$) of a succeeding third delivered impulse (C); and
    a comparator adapted to compare the first angular interval ($\Delta\phi_1$) with the second angular interval ($\Delta\phi_2$) to determine a difference between the first and the second angular intervals ($\Delta\phi_1$ and $\Delta\phi_2$);
    wherein the determination circuit is further adapted to determine whether a deviation exists between the first and the second angular intervals, $\Delta\phi_1$ and $\Delta\phi_2$, based on the determined difference between the first and the second angular intervals ($\Delta\phi_1$ and $\Delta\phi_2$).

11. A power wrench comprising the device according to claim 10.

12. A power wrench controller unit comprising the device according to claim 10.

\* \* \* \* \*